(No Model.) 3 Sheets—Sheet 1.
J. H. CROSKEY & J. LOCKE.
GLASS PRESS.
No. 528,080. Patented Oct. 23, 1894.
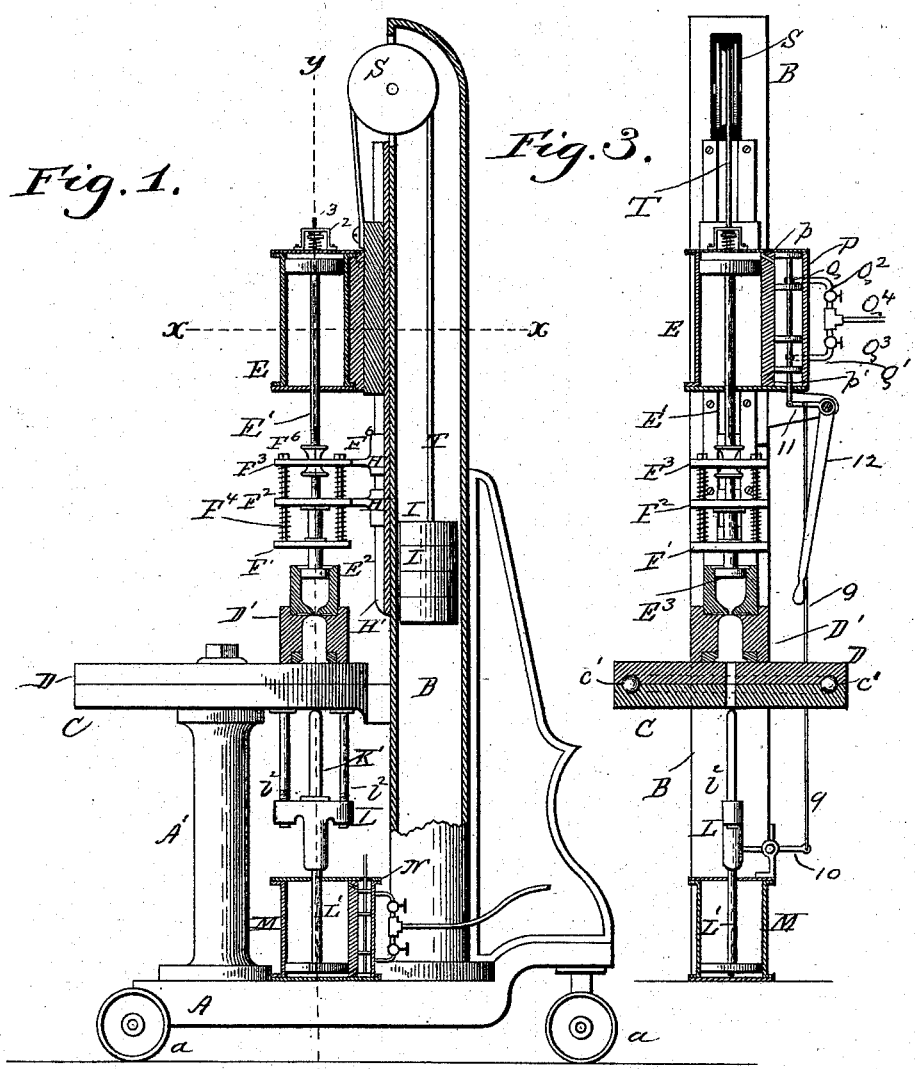

(No Model.) 3 Sheets—Sheet 2.
J. H. CROSKEY & J. LOCKE.
GLASS PRESS.
No. 528,080. Patented Oct. 23, 1894.
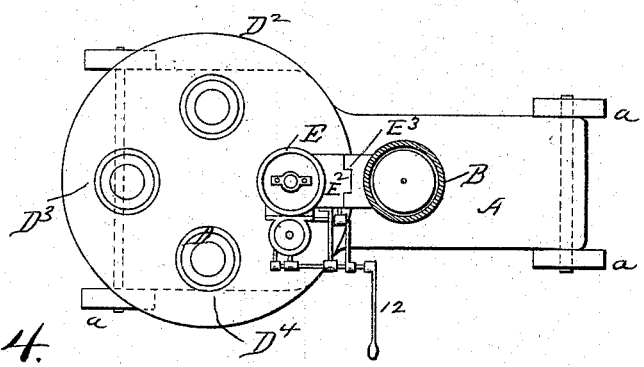
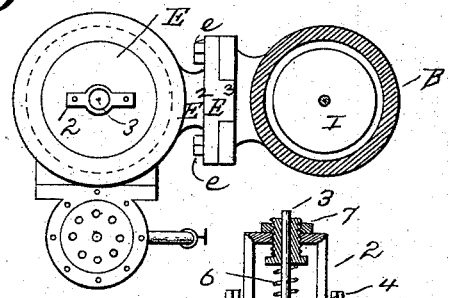
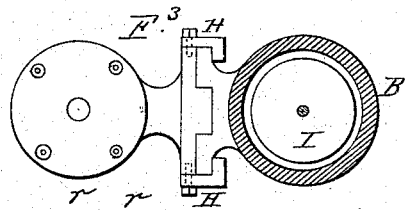
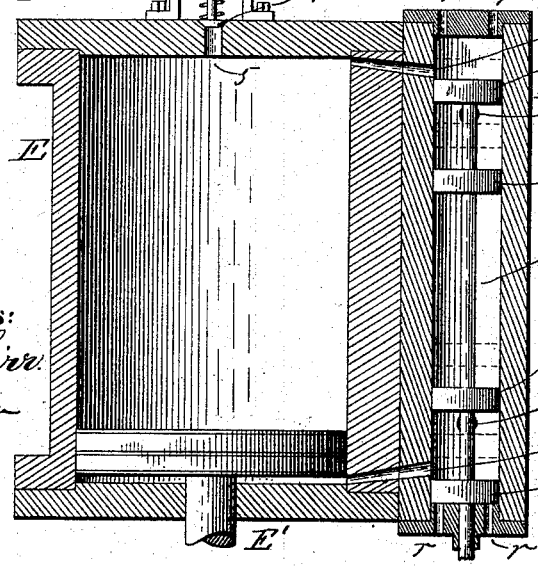

(No Model.) 3 Sheets—Sheet 3.

J. H. CROSKEY & J. LOCKE.
GLASS PRESS.

No. 528,080. Patented Oct. 23, 1894.

Witnesses:
J. B. McGirr
Harry Barton

Inventors
John H. Croskey
Joseph Locke
by Connolly Bros
Attys

UNITED STATES PATENT OFFICE.

JOHN H. CROSKEY AND JOSEPH LOCKE, OF PITTSBURG, PENNSYLVANIA.

GLASS-PRESS.

SPECIFICATION forming part of Letters Patent No. 528,080, dated October 23, 1894.

Application filed January 13, 1894. Serial No. 496,786. (No model.)

*To all whom it may concern:*

Be it known that we, JOHN H. CROSKEY and JOSEPH LOCKE, citizens of the United States, residing at Pittsburg, in the county of Allegheny and State of Pennsylvania, have invented certain new and useful Improvements in Glass-Presses; and we do hereby declare the following to be a full, clear, and exact description of the invention, such as will enable others skilled in the art to which it appertains to make and use the same.

This invention has relation to glass presses, for pressing hollow articles of glassware, and has for its object, the provision of novel appliances for the utilization of air pressure in actuating the moving parts of the press.

The invention consists in the novel construction, combination and arrangement of devices hereinafter described and claimed.

Figure 7:
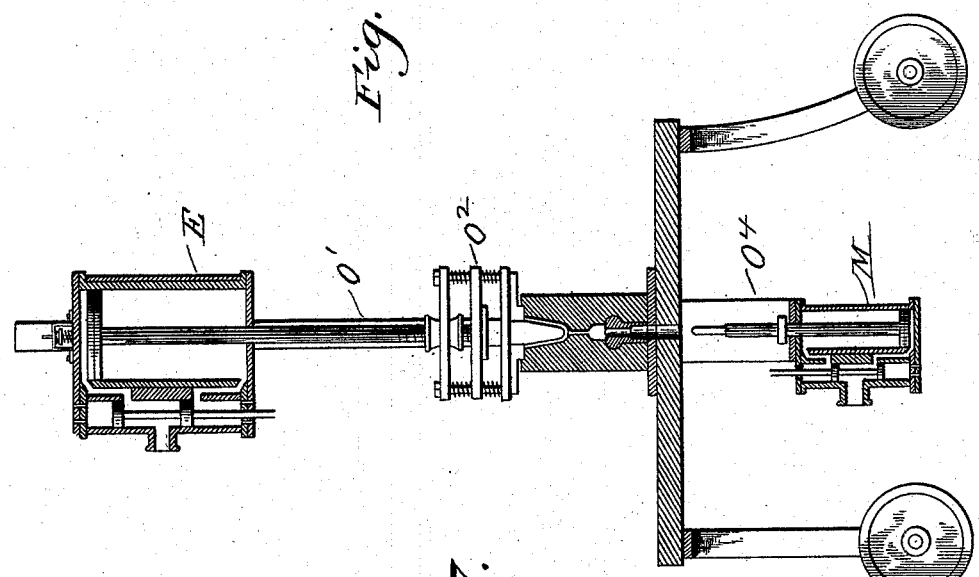

In the accompanying drawings, Figure 1 is a vertical central section of a glass press embodying our improvements. Fig. 2 is a horizontal section on the line $x—x$ of Fig. 1. Fig. 3 is a vertical section on the line $y—y$ of Fig. 1. Figs. 4, 5, and 6 are sectional details. Fig. 7 is a vertical central section of a modified form of glass press, and Fig. 8, a vertical transverse section of the same.

Briefly stated, the press embodying our improvements, in its most complete form, comprises a base, preferably mounted on wheels, so as to be portable, an upright frame or standard supported on said base adjacent to a rotary table upon which the molds are mounted, an air cylinder above the table to the piston of which is connected a plunger and an air cylinder below the table to the piston of which is connected a plug or plugs which pass through the table and into the mold; both the air cylinders being provided with suitable valves and devices for operating the same, as hereinafter described. The upper air cylinder is secured to the standard and is adjustable thereon while the lower cylinder is mounted on the base of the press. The upper cylinder is counter balanced so as to facilitate its adjustment. The air valves of the two cylinders are coupled together and a lever is employed to operate both air valves simultaneously in such a way that the air will be admitted above the piston of the upper cylinder so as to depress the plunger and below the piston of the lower cylinder so as to raise the plugs simultaneously or nearly simultaneously with the descent of the plunger.

The application to a glass press of two air cylinders is a feature of our invention and a subsidiary feature consists in combining with the air system a valve or valves which will limit the pressure of the air and prevent its exceeding a certain definite limit the purpose being to obviate certain radical defects in pneumatic glass presses heretofore employed.

In the accompanying drawings A, designates the base or bed of the press mounted on wheels $a, a$.

A′, designates a pillar rising from the base A, and supporting a circular table C, upon which is mounted a concentric plate D, which is adapted to rotate upon the table C, being pivotally attached thereto and to the pillar A′. The opposing surfaces of the table C, and plate D, are concentrically grooved to receive anti-friction balls $c'\ c'$.

D′, designates a mold mounted upon the plate D, near its periphery and in position beneath the plunger and above the plug or plugs. Similar molds $D^2$, $D^3$, $D^4$ are arranged at equal intervals apart upon said plate and are successively brought under the plunger as the table is revolved. The mold has a cavity in which the articles are formed by pressure from a fount over a plug. Several such cavities and several plugs may be employed to produce several articles in the same mold. The press however is adapted for other kinds of molds which need not be specifically described, as the present application does not relate to the specific structure of the mold.

E, designates the upper air cylinder to the piston of which is attached the rod E′, supporting at its lower end the plunger $E^2$, which passes through a spring plate F′, that is attached to the screw E′, by means of a stationary plate $F^2$, a plate $F^3$, rods $F^4\ F^4$, springs $F^5$, $F^5$, and nuts $F^6$, $F^6$, which regulate the strength of the springs $F^4\ F^4$. The plates $F^2$, $F^3$, are guided in their movement by angle plates H, H, which embrace ways H′ H′, on a standard B. The upper air cylinder E, has an offset $E^2$, formed with a tongue $E^3$, which fits in a longitudinal groove in the front of the standard B, and is secured to said standard by means of screws e, e, which may be taken out when it is desired to adjust the cylinder to a different position. The cylinder is counterbalanced for convenience of adjustment by means of weights I, I, attached to a strap T, passing over a pulley S, mounted in the upper part of the standard B, which is hollow so as to receive the weights I, I.

P, designates the valve chest of the cylinder E, and N, designates a similar valve chest arranged on the lower air cylinder M. The two valve chests and their valves and appurtenant parts are identical so that a specific description of one will suffice. Referring then to the upper air cylinder the valve chest P, is a cylindrical structure having ports $p$, $p'$, leading into the cylinder E, at its top and bottom.

Q, Q', are inlet ports to the valve chest for the admission of air from a source of supply and $Q^2$, $Q^3$, are branches of a main air supply pipe $Q^4$ each of said branches being provided with a valve $q^2$, $q^3$, to regulate the supply. The inlet port Q, is below the upper inlet port to the cylinder E, while the inlet port Q', is above the inlet port P' to the lower end of the cylinder. The air valve consists of a rod $P^3$, upon which are mounted the packed heads or disks $P^4$, $P^5$, $P^6$, and $P^7$. The air is admitted above the head $P^5$, to supply the upper end of the cylinder E, and below the head $P^6$, to supply the lower end of the cylinder E. The valve is operated so as to alternately open the port P, to communication with the branch $Q^2$, and the port P', to communication with the branch $Q^3$, and is balanced by the arrangement of the heads $P^4$, $P^5$, $P^6$, $P^7$. The ends of the valve chest have exhaust holes $r$, $r$, through which the air from the cylinder E, is exhausted when it has done its work.

Heretofore it has been found exceedingly difficult, if not practicably impossible in pneumatic glass presses to control the pressure of the air on the plunger piston so as to prevent it from exceeding the pressure required for the work, it being left to the skill and nice judgment of the operator to determine at what point the air had to be cut off. In order to obviate this difficulty and permit of the press being operated by unskilled hands, we provide the air cylinder with an automatic air valve, which is in the nature of a safety valve and which being adjusted to open under a predetermined pressure, will so open automatically when the pressure within the cylinder exceeds the required degree. This safety valve may consist as shown of a cage 2, through which passes a valve stem 3, carrying a valve 4, which closes an exhaust port 5, and is held to its seat by a spring 6, the pressure of which is regulated by a nut 7. This valve is only required on the upper end of the cylinder E, and may if desired be placed on the lower end of the lower air cylinder M, as it is immaterial what pressure is employed in withdrawing the plunger or plugs.

The valve chest of the lower cylinder, and through it the lower cylinder M, is supplied with air from the same source and through the same kind of connections as the upper cylinder. The air supply valves of the upper and lower cylinders are coupled together by means of the connecting rod 9 and levers 10 and 11. The lever 11, is furnished with an operating handle 12, by means of which both valves are operated simultaneously, one valve being raised while the other is lowered and vice versa, the result being that as the handle is moved in one direction the plunger and plugs will approach each other and when the handle is moved in the reverse direction they will recede.

The plug K', is supported on a cross head L, mounted on the upper end of the lower piston rod L', and the cross head is guided and supported by rods $l^2$, $l^2$, depending from the table C, and having nuts $i^2$, $i^2$, on their ends.

Figure 8:
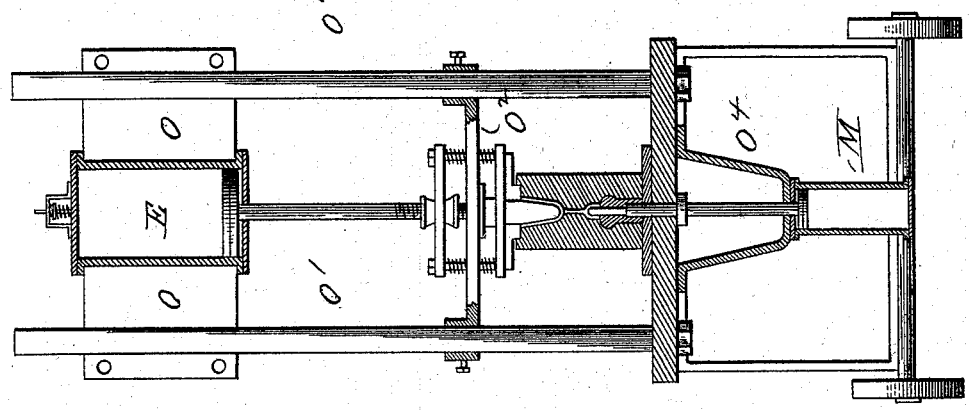

In Figs. 7, and 8, of the drawings we have shown the two air cylinders applied to a press of the ordinary structure for pressing stemmed table ware and in these figures of the drawings the upper cylinder is represented as having side plates O, O, which embrace the uprights O', O', rising from the mold table, while the plunger spring head is guided by the cross head $O^2$, the ends of which embrace and slide on the uprights O' O'. The lower cylinder is supported from the bottom of the mold table by a suitable hanger $O^4$.

Having described our invention, we claim—

1. In a glass press, the combination with a mold, a plunger adapted to press glass in the same, and an air cylinder having a piston connected to said plunger, of a reciprocating plug adapted to enter said mold and form a cavity in the glass and an air cylinder having a piston connected to said plug, said plug being constructed, proportioned and arranged to fill and close the opening in the base of the mold, and prevent the exudation of the glass substantially as described.

2. In a glass press, the combination of a mold, a plunger adapted to press glass in said mold, an air cylinder having a piston connected to said plunger and a spring plate or follower, of a plug adapted to enter the mold from below and an air cylinder having a piston connected to said plug, substantially as described.

3. In a glass press, the combination with a mold for making hollow glass ware, of a plunger to press the glass in the mold, a piston to which said plunger is attached, an air cylinder in which the piston works, a valve by which the admission of air to the cylinder is controlled, a plug arranged below the mold and adapted to enter the same and form a cavity in the glass, a piston to which said plug is attached, an air cylinder and its supply valve, connections between the valves of the two cylinders and a hand controlled lever by which both valves are operated simultaneously and at the will of the operator, substantially as described.

4. In a glass press, the combination with a fount, a mold arranged below the same, a plunger adapted to press glass from said fount and an air cylinder having a piston connected to said plunger, of a plug adapted to enter said mold and an air cylinder having a piston connected to said plug, substantially as described.

In testimony whereof we affix our signatures in presence of two witnesses.

J. H. CROSKEY.
JOSEPH LOCKE.

Witnesses:
ALBERT J. HENNING,
C. E. SUCCOP.